US012435562B2

(12) United States Patent
Jiang et al.

(10) Patent No.: US 12,435,562 B2
(45) Date of Patent: Oct. 7, 2025

(54) MOUNTING DEVICE FOR ELECTRIC CURTAIN

(71) Applicant: NINGBO SUNFREE MOTOR TECHNOLOGY COMPANY LIMITED, Ningbo (CN)

(72) Inventors: Chun Jiang, Ningbo (CN); Jianhong Wei, Ningbo (CN)

(73) Assignee: NINGBO SUNFREE MOTOR TECHNOLOGY COMPANY LIMITED, Ningbo (CN)

(*) Notice: Subject to any disclaimer, the term of this patent is extended or adjusted under 35 U.S.C. 154(b) by 155 days.

(21) Appl. No.: 18/379,413

(22) Filed: Oct. 12, 2023

(65) Prior Publication Data

US 2024/0287852 A1 Aug. 29, 2024

(30) Foreign Application Priority Data

Feb. 23, 2023 (CN) ........................ 202310162884.X

(51) Int. Cl.
*E06B 9/323* (2006.01)

(52) U.S. Cl.
CPC .................................... *E06B 9/323* (2013.01)

(58) Field of Classification Search
CPC ... E06B 9/42; E06B 9/323; E06B 9/72; E06B 9/68
See application file for complete search history.

(56) References Cited

U.S. PATENT DOCUMENTS 11,421,473 B2 * 8/2022 Campagna ................ E06B 9/72
11,713,619 B2 * 8/2023 Negrello ................. E06B 9/322 160/168.1 P
12,000,209 B2 * 6/2024 Tan ........................... E06B 9/72
12,044,068 B2 * 7/2024 Blair ......................... E06B 9/72
12,091,911 B2 * 9/2024 Thumerel ............... E06B 9/308
12,252,935 B2 * 3/2025 Menendez ................ E06B 9/44
2021/0198942 A1 * 7/2021 Jiang ......................... F16H 1/16
2021/0203207 A1 * 7/2021 Jiang ......................... E06B 9/72
2022/0228436 A1 * 7/2022 Jiang ...................... H02K 7/003
2022/0333438 A1 * 10/2022 Huang .................... E06B 9/322
2024/0003185 A1 * 1/2024 Brondex ................... E06B 9/50
2024/0044204 A1 * 2/2024 Shivell ...................... E06B 9/44
2024/0138607 A1 * 5/2024 Jiang ....................... E06B 9/262

* cited by examiner

*Primary Examiner* — Bradley Duckworth
(74) *Attorney, Agent, or Firm* — Juan Carlos A. Marquez; Marquez IP Law Office, PLLC

(57) ABSTRACT

A mounting device for an electric curtain is provided, comprising a mounting rail with opposed first end and second end; a drive device, mounted at the first end of the mounting rail; a power supply device, comprising a power supply box mounted at the second end of the mounting rail, a detachable power supply pack mounted inside the power supply box; an auxiliary circuit board with a power supply interface and a first splicing interface is mounted inside the power supply box, a second splicing interface inserted to the first splicing interface is disposed on the power supply pack, and the drive device is electrically connected to the auxiliary circuit board through a power wire; the separation of power supply device and the drive device facilitates assembling and change of the power supply device, and the power supply pack is easy to change and exposed interface for diversifying power supplies.

10 Claims, 6 Drawing Sheets

MOUNTING DEVICE FOR ELECTRIC CURTAIN

This application is based upon and claims priority to Chinese Patent Application No. 202310162884.X, filed on Feb. 23, 2023, the entire contents of which are incorporated herein by reference.

TECHNICAL FIELD

The present invention relates to the technical field of electric curtains and in particular to a mounting device for an electric curtain.

BACKGROUND

Electric curtains cannot work without power supply. Generally, the electric curtains include a wired power supply mode and a wireless power supply mode. In the wired power supply mode, the power supply is achieved by connecting a plug to a socket. This structure has requirements for mounting position, for example, a wire should be pre-buried, leading to inconvenient mounting and tedious operations. Further, a plug wire is exposed, bringing poor aesthetic and accumulating dusts. In the wired power supply mode, a battery is used to supply power. But, since the battery is to be mounted inside the mounting rail, it is troublesome to change it each time and it is easy to bring damage to surrounding accessories. Therefore, it is urgent to address a problem of how to supply power to the electric curtains with good aesthetics and good conveniences.

SUMMARY

In order to address the above technical problems, the present invention provides a mounting device for an electric curtain, which can realize convenient power supply with broad power supply modes available.

In order to address the above technical problems, the present invention adopts the following technical solution: there is provided a mounting device for an electric curtain, comprising:

- a mounting rail, provided with opposed first end and second end;
- a drive device, mounted at the first end of the mounting rail;
- a power supply device, comprising a power supply box and a detachable power supply pack, where the power supply box is mounted at the second end of the mounting rail, the power supply pack is detachably mounted inside the power supply box, an auxiliary circuit board is mounted inside the power supply box, the auxiliary circuit board is provided with a power supply interface and a first splicing interface, a second splicing interface inserted to the first splicing interface is disposed on the power supply pack, and the drive device is electrically connected to the auxiliary circuit board through a power wire.

Furthermore, a clamping groove and a mounting cavity are disposed sequentially from top down on the mounting rail, and the clamping groove and the mounting cavity both penetrate through both ends along a length direction of the mounting rail.

Furthermore, the drive device is inserted into the mounting cavity, with an end exposed outside the mounting cavity, and the drive device blocks an end portion of the first end of the mounting rail.

Furthermore, the power supply box is connected to the second end of the mounting rail to form a splicing structure. A connection portion is disposed at an end of the power supply box facing toward the mounting rail, and the connection portion is cooperatively inserted into the mounting cavity of the mounting rail.

Furthermore, a first bracket extending downward is disposed at an end of the drive device, and a second bracket extending downward is disposed at an end of the power supply box away from the connection portion. A winding tube is disposed between the first bracket and the second bracket. A master wheel is disposed on the first bracket and a slave wheel is disposed on the second bracket. The master wheel and the slave wheel are connected to both ends of the winding tube respectively. The drive device rotates the master wheel to drive the winding tube to rotate.

Furthermore, a blocking surface extending downward is disposed on a front surface of the mounting rail to block the winding tube and a decorative surface spliced with the blocking surface is disposed on a front surface of the power supply box to block the winding tube.

Furthermore, a side insertion groove penetrating through both ends is disposed on a back surface of the mounting rail, and a connection groove corresponding to the side insertion groove is disposed on a back surface of the power supply box. The connection groove penetrates through both ends along a length direction of the power supply box.

Furthermore, a motor and an electric control board are disposed inside the drive device, and an additional circuit board and a transmission assembly are disposed at an end of the drive device. The motor drives the master wheel to rotate through the transmission assembly. The additional circuit board is electrically connected to the electric control board. The electric control board is electrically connected to the auxiliary circuit board. The motor is electrically connected to the electric control board.

Furthermore, the power supply interface is exposed on a back surface of the power supply box and the power supply interface can be electrically connected to an external power supply.

Furthermore, a power supply cabinet for horizontally mounting and dismounting the power supply pack and a mounting cabinet for mounting the auxiliary circuit board are disposed inside the power supply box. The power supply cabinet is in communication with the mounting cabinet. A cabinet cover for closing and opening the power supply cabinet is disposed on a front surface of the power supply box. An elastic clip for opening and closing the cabinet cover is disposed at the right side of the power supply cabinet on the power supply box.

Furthermore, a plurality of reinforcing ribs arranged in an equal spacing are disposed in a convex manner on the bottom of the power supply cabinet, and at least one reinforcing rib is disposed in a convex manner on a side surface away from the mounting cabinet inside the power supply cabinet.

Furthermore, a first limiting portion is disposed at a position close to the mounting cabinet inside the power supply cabinet; a groove matching the first limiting portion is disposed on the power supply pack; a second limiting portion is disposed in a convex manner on an inner surface of the cabinet cover.

Furthermore, the power supply pack is a primary battery pack or a secondary battery pack, and a charge interface is disposed on the secondary battery pack.

Compared with the existing technologies, the present invention has the following advantages: the power supply device and the drive device are disposed on both ends of the mounting rail respectively such that the power supply device and the drive device are separated to facilitate assembling and change of the power supply device. Further, the power supply pack is detachably mounted inside the power supply device, which facilitates change of the power supply pack without damaging surrounding accessories. Furthermore, the power supply interface is exposed on the power supply box of the power supply device and the power supply interface can be electrically connected to an external power supply. When people do not desire to change the power supply pack, they may select to supply power by using a mobile power supply, or a solar charge panel or a direct current power supply, achieving simple power supply and diversifying power supply modes. Thus, diverse requirements of users can be satisfied.

BRIEF DESCRIPTION OF THE DRAWINGS

In order to describe the embodiments of the present invention or the technical solution of the prior art more clearly, brief descriptions will be made below to the accompanying drawings involved in descriptions of the embodiments or the prior art. Obviously, the accompanying drawings are merely illustrative, and other drawings may also be obtained by those skilled in the art based on these drawings without paying creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present invention without affecting the effects and the purposes achieved by the present invention.

Figure 1:
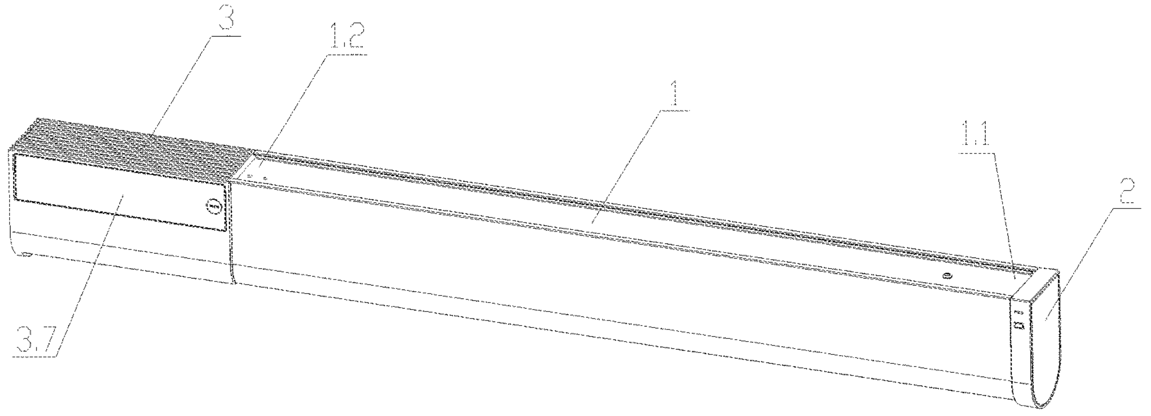
FIG. 1 is a schematic diagram illustrating a structure of the present invention.
Figure 2:
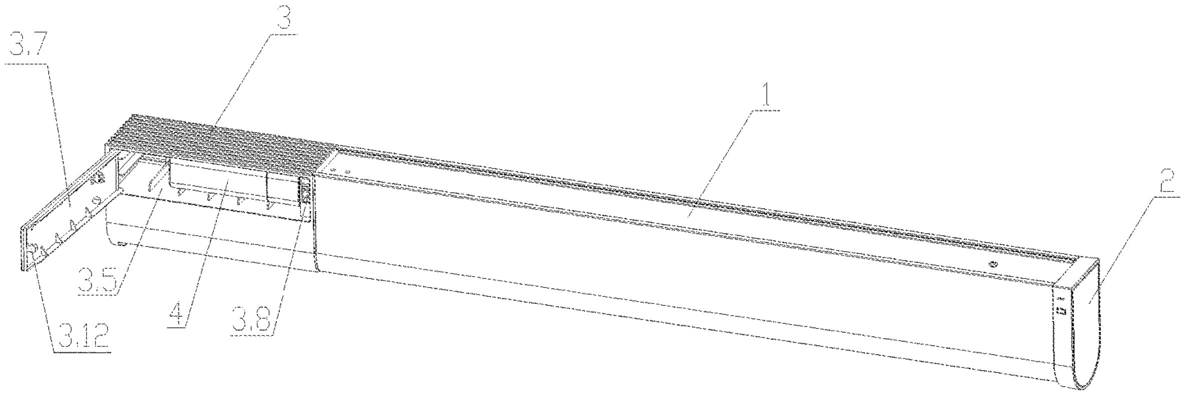
FIG. 2 is a structural schematic diagram illustrating a cabinet cover in an opened state according to the present invention.

Numerals of drawings are described below: 1. mounting rail, 1.1. first end, 1.2. second end, 1.3. clamping groove, 1.4. mounting cavity, 1.5. blocking surface, 1.6 side insertion groove, 2. drive device, 2.1. first bracket, 2.2. motor, 2.3. electric control board, 2.4. additional circuit board, 2.5. transmission assembly, 3. power supply box, 3.1. connection portion, 3.2. second bracket, 3.3. decorative surface, 3.4. connection groove, 3.5. power supply cabinet, 3.6. mounting cabinet, 3.7 cabinet cover, 3.8. elastic clip, 3.9*a*. and 3.9*b* reinforcing ribs, 3.10. first limiting portion, 3.11. second limiting portion, 3.12. locking piece, 4. power supply pack, 4.1 second splicing interface, 4.2 groove, 4.3 charge interface, 5. auxiliary circuit board, 5.1 power supply interface, 5.2 first splicing interface, 6. winding tube, 7. master wheel, and 8. slave wheel.

EMBODIMENTS

The present invention will be further detailed below in combination with specific embodiments.

In the descriptions of the present invention, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present invention.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present invention, the meaning of "several" refers to at least two, for example, two or three or the like, unless otherwise clearly stated.

In the present invention, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present invention according to actual situations.

In the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

As shown in FIGS. 1 to 9, the present invention provides a mounting device for an electric curtain, comprising: a mounting rail 1 with opposed first end 1.1 and second end 1.2; a drive device 2, mounted at the first end 1.1 of the mounting rail 1 to output power to drive the curtain to electrically open or close; a power supply device, for supplying power to the drive device 2, where the power supply device comprises a power supply box 3 and a detachable power supply pack 4. The power supply box 3 is mounted at the second end 1.2 of the mounting rail 1, and the power supply pack 4 is detachably mounted inside the power supply box 3. An auxiliary circuit board 5 is mounted inside the power supply box 3, and a power supply interface 5.1 and a first splicing interface 5.2 are disposed on the auxiliary circuit board 5. A second splicing interface 4.1 inserted to the first splicing interface 5.2 is disposed on the power supply pack 4, and the first splicing interface 5.2 can be inserted to the second splicing interface 4.1 for power supply. The drive device 2 is electrically connected to the auxiliary circuit board 5 via a power wire. The power supply interface 5.1 is exposed on a back surface of the power supply box 3, and used to electrically connect to an external power supply. The external power supply may be a mobile power supply, a solar charge panel, or a direct current power supply pre-buried in a wall or the like. In the present invention, the power supply device and the drive device 2 are mounted at both ends of the mounting rail 1 respectively such that the power supply device and the drive device are separated to facilitate assembling and change of the power supply device. Further, the power supply pack 4 is detachably mounted inside the power supply device, which facilitates change of the power supply pack 4 without damaging surrounding accessories. Furthermore, the power supply interface 5.1 is exposed on the power supply box 3 of the power supply device and the power supply interface 5.1 can be electrically connected to an external power supply. Therefore, when people do not desire to change the power supply pack 4, they may select to supply power by using a mobile power supply, or a solar charge panel or a direct current power supply, achieving simple power supply and diversifying power supply modes. Moreover, the charging can be performed by using an ordinary disposable battery or a charge battery or an external power supply, so as to satisfy diverse requirements of users and hence broaden its applications.

Figure 8:
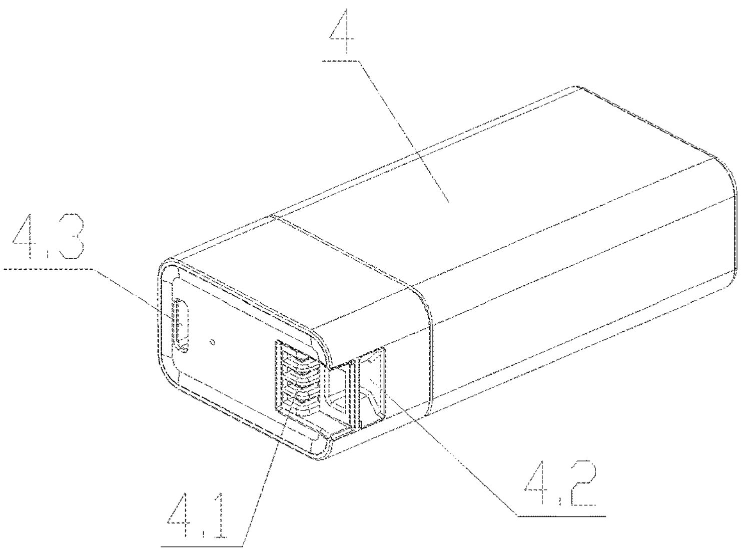
FIG. 8 is a structural schematic diagram illustrating a power supply pack according to the present invention.

With reference to FIG. 8, the power supply pack 4 is a primary battery pack or a secondary battery pack. The primary battery pack preferably is a dry cell pack, and the secondary battery pack preferably is a lithium battery pack or other chargeable battery pack. A charge interface 4.3 is disposed on the secondary battery pack to help to perform direct charging after change, without dismounting the lithium battery inside, brining conveniences to use.

By referring to FIGS. 5, 6, 7, and 8, a power supply cabinet 3.5 for horizontally mounting and dismounting the power supply pack 4 and a mounting cabinet 3.6 for mounting the auxiliary circuit board 5 are disposed inside the power supply box 3. The power supply cabinet 3.5 is in communication with the mounting cabinet 3.6 to facilitate insertion connection of the first splicing interface 5.2 and the second splicing interface 4.1. A cabinet cover 3.7 for closing and opening the power supply cabinet 3.5 is disposed on a front surface of the power supply box 3 to cover the power supply pack 4, thereby achieving external aesthetic effect and protection against fall of the power supply pack 4. An elastic clip 3.8 for opening and closing the cabinet cover 3.7 is disposed at the right side of the power supply cabinet 3.5 on the power supply box 3, and a corresponding locking piece 3.12 is disposed on the cabinet cover 3.7. The locking piece 3.12 is matched with the elastic clip 3.8 in such a way that when the cabinet cover 3.7 is pressed one time, the elastic clip 3.8 locks the locking piece 3.12; and when the cabinet cover 3.7 is pressed again, the elastic clip 3.8 unlocks the locking piece 3.12. In this way, the cabinet cover 3.7 can be locked and unlocked, bringing simple use, simple structure and good aesthetics.

Figure 5:
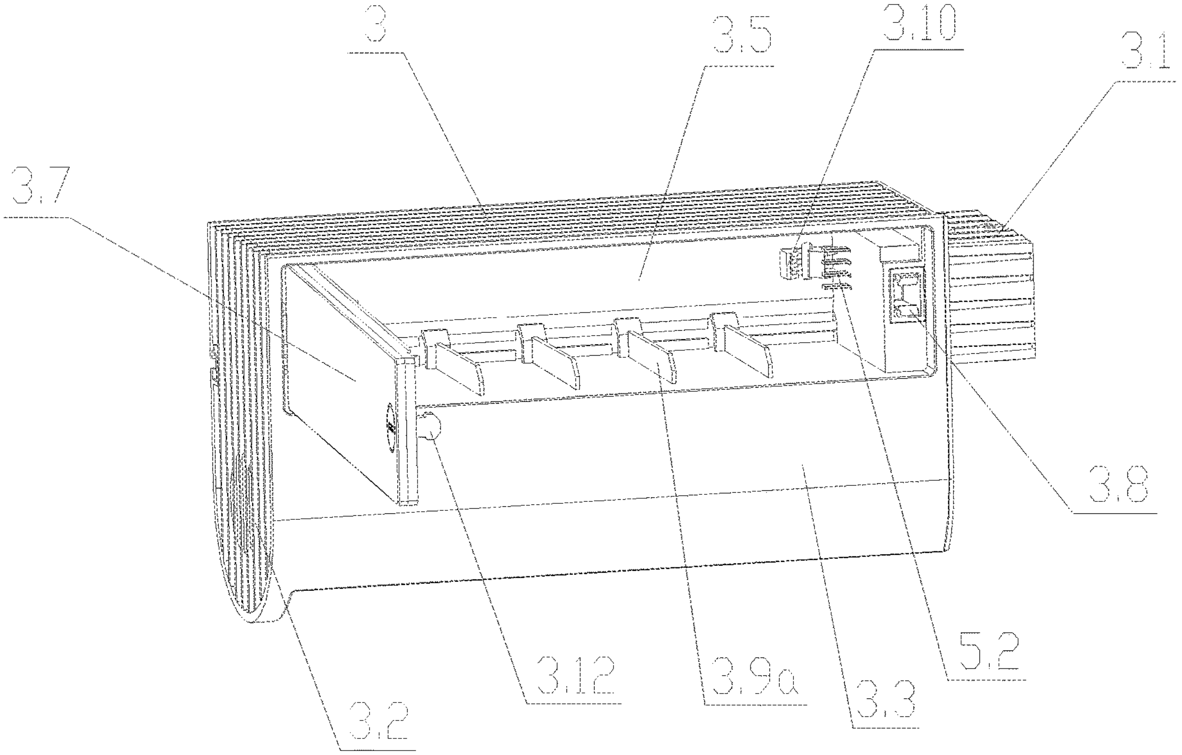
FIG. 5 is a structural schematic diagram illustrating a power supply box according to the present invention.
Figure 6:
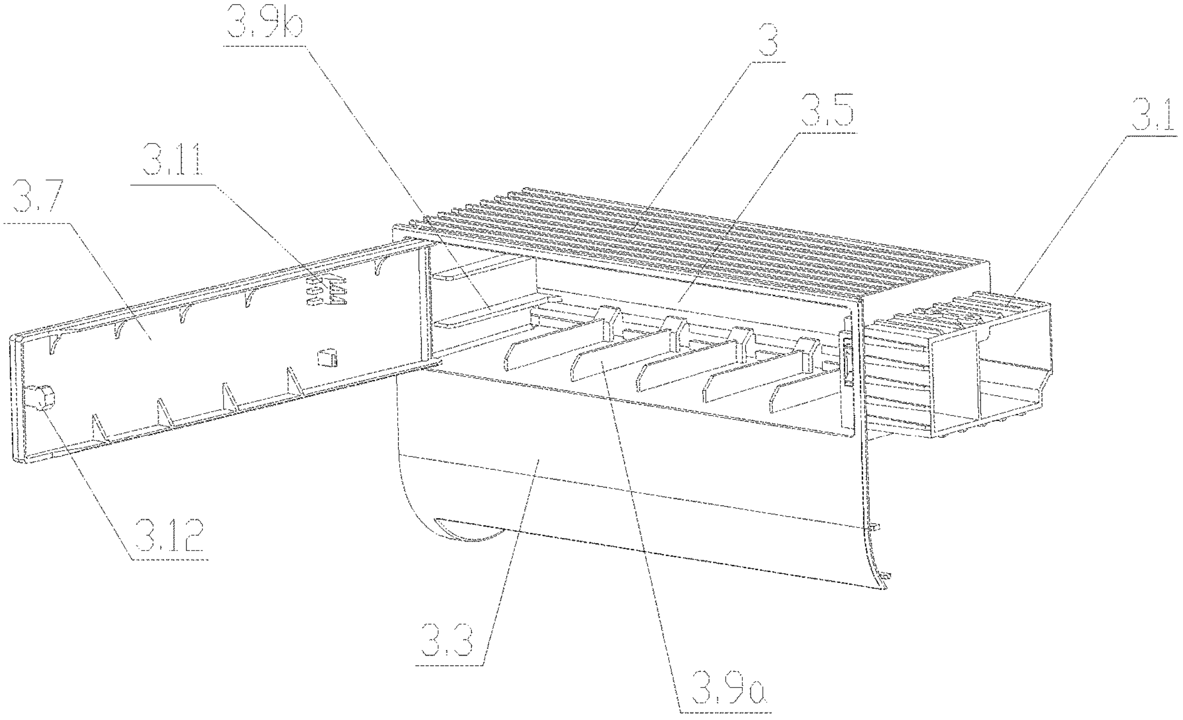
FIG. 6 is a structural schematic diagram illustrating a power supply box from another view angle according to the present invention.
Figure 7:
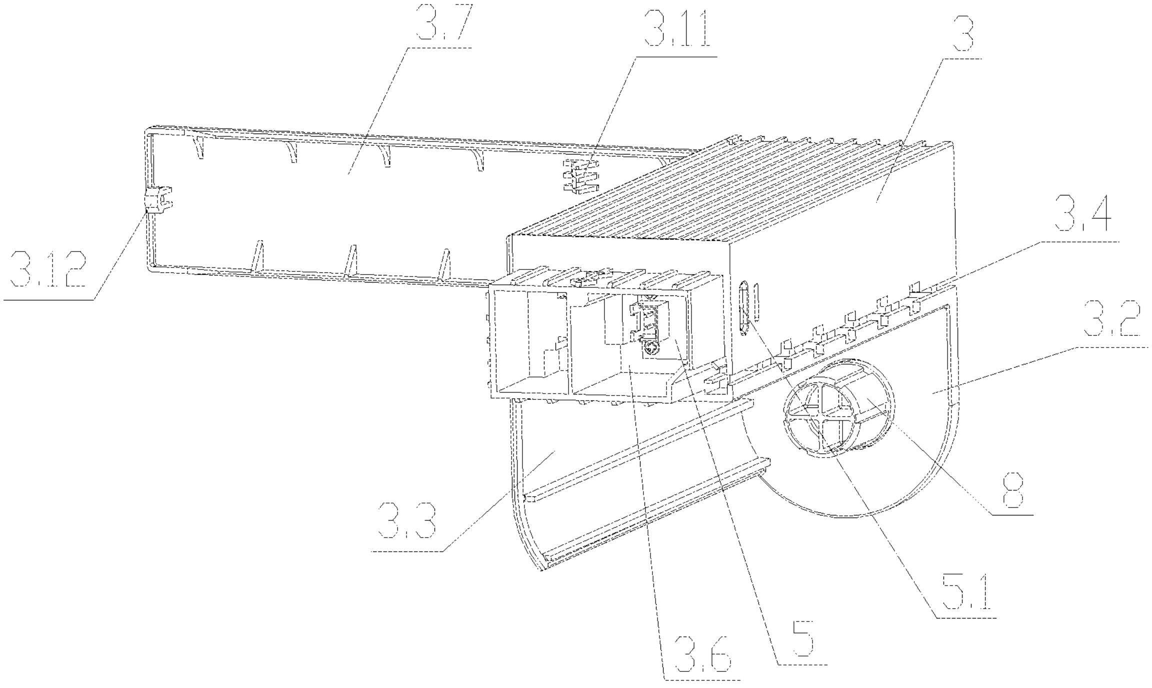
FIG. 7 is a structural schematic diagram illustrating a power supply box from another view angle according to the present invention.

By referring to FIGS. 5 and 6, a plurality of reinforcing ribs 3.9*a* arranged in an equal spacing are disposed in a convex manner on the bottom of the power supply cabinet 3.5. At least one reinforcing rib 3.9*b* is disposed in a convex manner on a side surface away from the mounting cabinet 3.6 inside the power supply cabinet 3.5. The disposal of the reinforcing ribs 3.9*a* and 3.9*b*, on one hand, reinforces the structure and on the other hand, enables the power supply pack 4 to be not in complete contact with the bottom surface and the side surfaces of the power supply cabinet 3.5, so as to form a gap for dissipating heat.

By referring to FIGS. 5 and 6, a first limiting portion 3.10 is disposed at a position close to the mounting cabinet 3.6 inside the power supply cabinet 3.5. Specifically, the first limiting portion 3.10 is located close to the mounting cabinet 3.6 on an inner back wall of the power supply cabinet 3.5. A groove 4.2 matching the first limiting portion 3.10 is disposed on the power supply pack 4. Specifically, the groove 4.2 is close to the second splicing interface 4.1. The first limiting portion 3.10 is matched with the groove 4.2 to limit the power supply pack 4 from sliding along a length direction of the power supply cabinet 3.5. A second limiting portion 3.11 is disposed in a convex manner on an inner surface of the cabinet cover 3.7. When the cabinet cover 3.7 is closed, the first limiting portion 3.10 and the second limiting portion 3.11 are distributed obliquely diagonally. The second limiting portion 3.11 may be abutted against the tail of the power supply pack 4, or fitted onto the tail of the power supply pack 4, further limiting the slide of the power supply pack 4. In this way, the power supply pack 4 may be fixed more stably, achieving safer structure.

Figure 4:
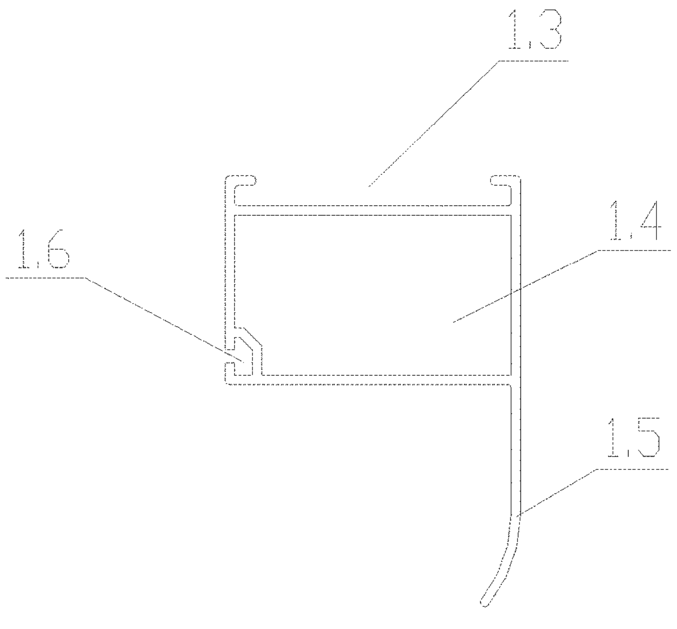
FIG. 4 is a side view of a mounting rail according to the present invention.

As shown in FIG. 4, a clamping groove 1.3 and a mounting cavity 1.4 are sequentially disposed from top down on the mounting rail 1. The clamping groove 1.3 and the mounting cavity 1.4 both penetrate to both ends along a length direction of the mounting rail 1. The clamping groove 1.3 is fitted to a mounting unit and then mounted to a window through the mounting unit. Multiple components may be mounted in the mounting cavity 1.4 based on actual assembly requirements to adapt to different types of curtains. The drive device 2 is inserted into the mounting cavity 1.4, with an end exposed outside the mounting cavity 1.4. Thus, the drive device 2 can block the end portion of the first end 1.1 of the mounting rail 1. The power supply box 3 is connected to the second end 1.2 of the mounting rail 1 to form a splicing structure. An end of the power supply box 3 facing toward the mounting rail 1 is provided with a connection portion 3.1. The connection portion 3.1 is cooperatively inserted into the mounting cavity 1.4 of the mounting rail 1. In order to reinforce the assembling, further reinforcement can be performed by using screws.

Figure 3:
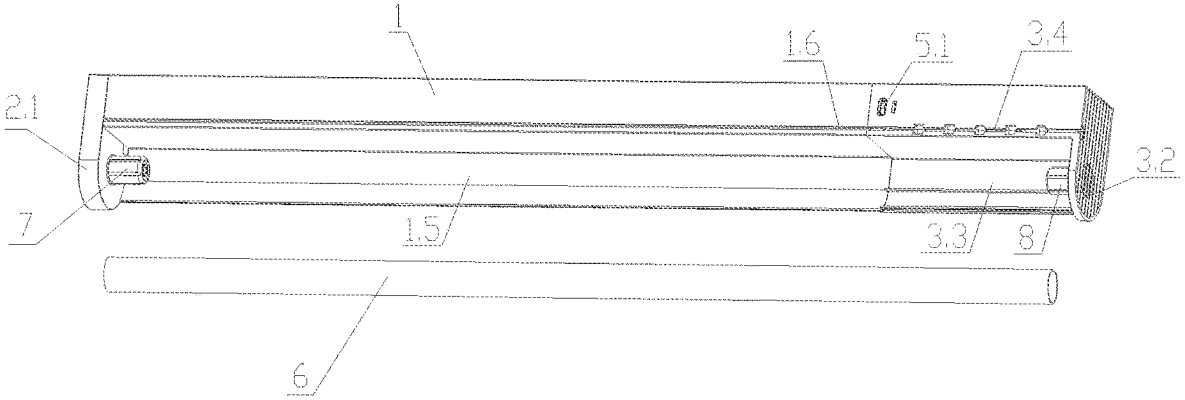
FIG. 3 is a structural schematic diagram illustrating a winding tube dismounted from another view angle according to the present invention.

With reference to FIG. 3, a first bracket 2.1 extending downward is disposed at an end of the drive device 2, and a second bracket 3.2 extending downward is disposed at an end of the power supply box 3 away from the connection portion 3.1. A winding tube 6 is disposed between the first bracket 2.1 and the second bracket 3.2. A master wheel 7 is disposed on the first bracket 2.1 and a slave wheel 8 is disposed on the second bracket 3.2. The master wheel 7 and the slave wheel 8 are connected to both ends of the winding tube 6 respectively. The drive device 2 rotates the master wheel 7 to drive the winding tube 6 to rotate. The winding tube 6 is used to wind a curtain body.

As shown in FIG. 3, a blocking surface 1.5 extending downward is disposed on a front surface of the mounting rail 1 to block the winding tube 6. A decorative surface 3.3 spliced with the blocking surface 1.5 is disposed on a front surface of the power supply box 3 to block the winding tube 6. The blocking surface 1.5 and the decorative surface 3.3 both can achieve aesthetic effect.

As shown in FIG. 3, a side insertion groove 1.6 penetrating through both ends is disposed on a back surface of the mounting rail 1. A connection groove 3.4 corresponding to the side insertion groove 1.6 is disposed on a back surface of the power supply box 3. The connection groove 3.4 penetrates through both ends along a length direction of the power supply box 3. The side insertion groove 1.6 and the connection groove 3.4 are disposed to connect with the curtain body in a fitting manner and can be applied to a double-layer curtain or a Roman curtain or the like. Furthermore, the connection groove 3.4 is in communication with the power supply cabinet 3.5 to help dissipate heat.

Figure 9:
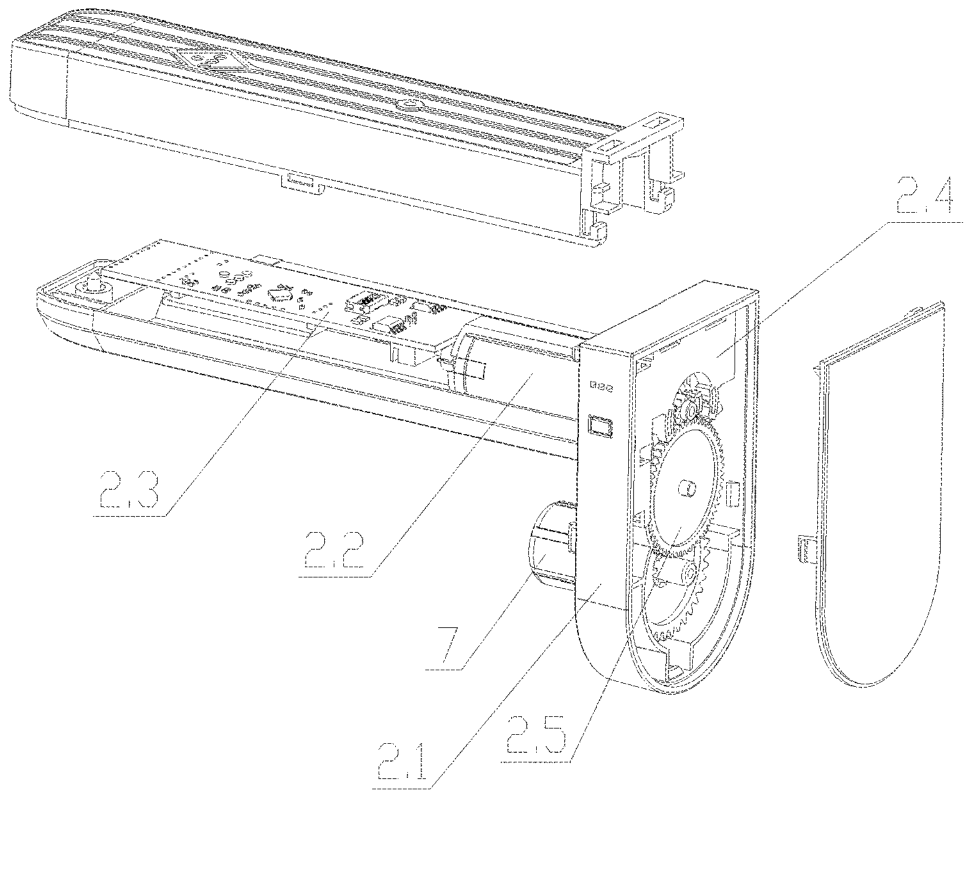
FIG. 9 is a schematic diagram illustrating an internal structure of a drive device according to the present invention.

As shown in FIG. 9, a motor 2.2 and an electric control board 2.3 are disposed inside the drive device 2 and an additional circuit board 2.4 and a transmission assembly 2.5 are disposed at an end of the drive device 2. The motor 2.2 drives the master wheel 7 to rotate through the transmission assembly 2.5. The additional circuit board 2.4 is electrically connected to the electric control board 2.3. The electric control board 2.3 is electrically connected to the auxiliary circuit board 5. The motor 2.2 is electrically connected to the electric control board 2.3. The electric control board 2.3 is a MCU board which can control the motor 2.2 to work. The additional circuit board 2.4 is a PCB board. The motor 2.2 comprises a motor core and a speed reducer, both of which are commercially available. The transmission assembly 2.5 is a gear assembly or a belt assembly, which achieves power transmission. Generally, according to product requirements, the additional circuit board 2.4 is provided with a setting key, a switch, an indicator lamp, a data interface and an antenna, and windows in one-to-one correspondence with the setting key, the switch, the indicator lamp, the data interface and the antenna are disposed at an end of the drive device 2. The setting key is used for code matching, direction switching, and factory setting recovery; the switch is used to turn on or off the power supply; the indicator lamp is used to display a working state; the data interface is used for charge or plugging or data communication; the antenna is used to receive a signal. The specific position distribution of the setting key, the switch, the indicator lamp, the data interface and the antenna can be designed based on actual requirements and no limitation is made herein.

During use, the mounting device is mounted to the window. Because the power supply device and the drive device 2 are disposed at both ends of the mounting rail 1 respectively, the power supply pack 4 can be changed without interfering with the drive device 2. Therefore the service life is prolonged, and great conveniences are brought to the assembling and change of the power supply device. When the power supply device runs out of power, people may replace the power supply pack with a dry cell pack or a lithium battery pack by directly opening the cabinet cover 3.7. The change operation can be simply performed without damaging surrounding accessories. Alternatively, the power supply device may also be electrically connected through the power supply interface 5.1 to an external power supply such as a mobile power supply, or a solar charge panel, or a direct current power supply. There are several power supply modes available for selection, and therefore multiple requirements of consumers can be satisfied. The separation of the power supply device and the drive device 2 helps to dissipate heat and increase use safety. Since the motor 2.2, the electric control board 2.3 and the power supply pack 4 all can generate heat during operation, the separation of the motor 2.2, the electric control board 2.3 and the power supply pack 4 means separation of heat sources, thereby achieving better heat dissipation and better safety.

Materials, reagents and test instruments involved in the embodiments of the present invention are all commercially-available products in the field of electric curtains unless otherwise stated.

Finally, it is to be noted that, the above embodiments are used only to describe the technical solutions of the present invention rather than to limit the present invention. Although detailed descriptions are made to the present invention by referring to the preceding embodiments, those skilled in the art should understand that they still can make modifications to the technical solutions recorded in the above embodiments or make equivalent substitutions for some technical features therein. These modifications or substitutions do not cause the essences of the corresponding technical solutions to depart from the spirit and scope of the technical solutions of the embodiments of the present invention.

The invention claimed is:

1. A mounting device for an electric curtain, comprising:

a mounting rail, provided with opposed first end and second end;

a drive device, mounted at the first end of the mounting rail;

a power supply device, comprising a power supply box and a detachable power supply pack, and the power supply box is mounted at the second end of the mounting rail; the power supply pack is detachably mounted inside the power supply box; an auxiliary circuit board is mounted inside the power supply box; the auxiliary circuit board is provided with a power supply interface and a first splicing interface, a second splicing interface inserted to the first splicing interface is disposed on the power supply pack, and the drive device is electrically connected to the auxiliary circuit board through a power wire, wherein a clamping groove and a mounting cavity are disposed sequentially from top down on the mounting rail, and the clamping groove and the mounting cavity both penetrate through both ends along a length direction of the mounting rail, and the drive device is inserted into the mounting cavity, outside the mounting cavity, an end of drive device is exposed and blocks an end portion of the first end of the mounting rail.

2. The mounting device for an electric curtain of claim 1, wherein the power supply box is connected to the second end of the mounting rail to form a splicing structure; a connection portion is disposed at an end of the power supply box facing toward the mounting rail, and the connection portion is cooperatively inserted into the mounting cavity of the mounting rail.

3. The mounting device for an electric curtain of claim 2, wherein a first bracket extending downward is disposed at an end of the drive device, and a second bracket extending downward is disposed at an end of the power supply box away from the connection portion; a winding tube is disposed between the first bracket and the second bracket; a master wheel is disposed on the first bracket and a slave wheel is disposed on the second bracket; the master wheel and the slave wheel are connected to both ends of the winding tube respectively; the drive device rotates the master wheel to drive the winding tube to rotate.

4. The mounting device for an electric curtain of claim 3, wherein a blocking surface extending downward is disposed on a front surface of the mounting rail to block the winding tube and a decorative surface spliced with the blocking surface is disposed on a front surface of the power supply box to block the winding tube.

5. The mounting device for an electric curtain of claim 3, wherein a side insertion groove penetrating through both ends is disposed on a back surface of the mounting rail, and a connection groove corresponding to the side insertion groove is disposed on a back surface of the power supply box and the connection groove penetrates through both ends along a length direction of the power supply box.

6. The mounting device for an electric curtain of claim 3, wherein a motor and an electric control board are disposed inside the drive device, and an additional circuit board and a transmission assembly are disposed at an end of the drive device; the motor drives the master wheel to rotate through the transmission assembly; the additional circuit board is electrically connected to the electric control board; the electric control board is electrically connected to the auxiliary circuit board; the motor is electrically connected to the electric control board.

7. The mounting device for an electric curtain of claim 1, wherein the power supply interface is exposed on a back surface of the power supply box and the power supply interface is electrically connected to an external power supply.

8. The mounting device for an electric curtain of claim 1, wherein the power supply pack is a primary battery pack or a secondary battery pack, and a charge interface is disposed on the secondary battery pack.

9. A mounting device for an electric curtain, comprising:

a mounting rail, provided with opposed first end and second end;

a drive device, mounted at the first end of the mounting rail;

a power supply device, comprising a power supply box and a detachable power supply pack, and the power supply box is mounted at the second end of the mounting rail; the power supply pack is detachably mounted inside the power supply box; an auxiliary circuit board is mounted inside the power supply box; the auxiliary circuit board is provided with a power supply interface and a first splicing interface, a second splicing interface inserted to the first splicing interface is disposed on the power supply pack, and the drive device is electrically connected to the auxiliary circuit board through a power wire, wherein a power supply cabinet for horizontally mounting and dismounting the power supply pack and a mounting cabinet for mounting the auxiliary circuit board are disposed inside the power supply box; the power supply cabinet is in communication with the mounting cabinet, and a cabinet cover for closing and opening the power supply cabinet is disposed on a front surface of the power supply box; an elastic clip for opening and closing the cabinet cover is disposed at the right side of the power supply cabinet on the power supply box, and a first limiting portion is disposed at a position close to the mounting cabinet inside the power supply cabinet, a groove matching the first limiting portion is disposed on the power supply pack, and a second limiting portion is disposed in a convex manner on an inner surface of the cabinet cover.

10. The mounting device for an electric curtain of claim 9, wherein a plurality of reinforcing ribs arranged in an equal spacing are disposed in a convex manner on the bottom of the power supply cabinet, and at least one reinforcing rib is disposed in a convex manner on a side surface away from the mounting cabinet inside the power supply cabinet.

* * * * *